United States Patent [19]
Vento

[11] Patent Number: 6,038,993
[45] Date of Patent: Mar. 21, 2000

[54] LIVE WELL AERATOR SYSTEM

[76] Inventor: Thomas Joseph Vento, 1802 Mariner Dr., No. 21, Tarpon Springs, Fla. 34689

[21] Appl. No.: 09/211,498

[22] Filed: Dec. 14, 1998

[51] Int. Cl.⁷ .................................................... B63B 35/14
[52] U.S. Cl. .............................. 114/255; 261/121.2; 43/57
[58] Field of Search ................................ 114/255; 43/57; 261/29, 59, 64.1, 121.2

[56] References Cited

U.S. PATENT DOCUMENTS

| | | | |
|---|---|---|---|
| 4,033,280 | 7/1977 | Wood et al. ............................ | 114/255 |
| 4,708,084 | 11/1987 | Campau ................................... | 114/255 |
| 5,010,836 | 4/1991 | Riviezzo ................................. | 114/255 |
| 5,632,220 | 5/1997 | Vento ...................................... | 114/255 |

*Primary Examiner*—Stephen Avila
*Attorney, Agent, or Firm*—Pendorf & Cutliff

[57] ABSTRACT

A live well aeration system in which a pump is used to pump water from a sea chest to a bait well containing live bait, wherein the sea chest is provided with a vent line for releasing air from the sea chest, thereby preventing air from entering the pump and causing air lock. The vent line is provided with a valve which is preferably closed at rest, opens in response to rising air, and closes in response to rising water.

12 Claims, 2 Drawing Sheets

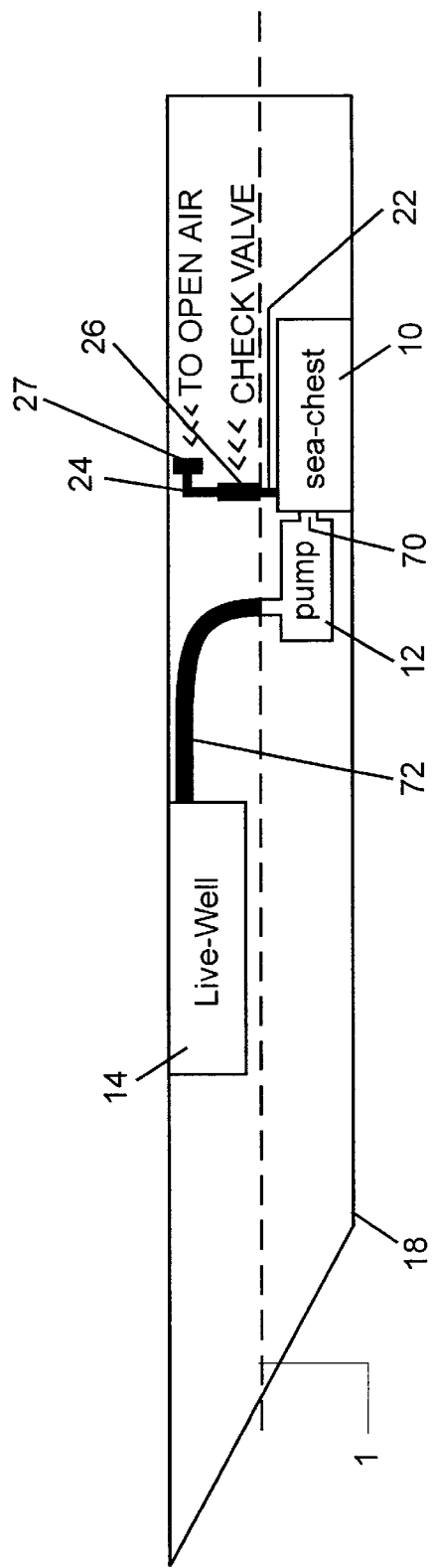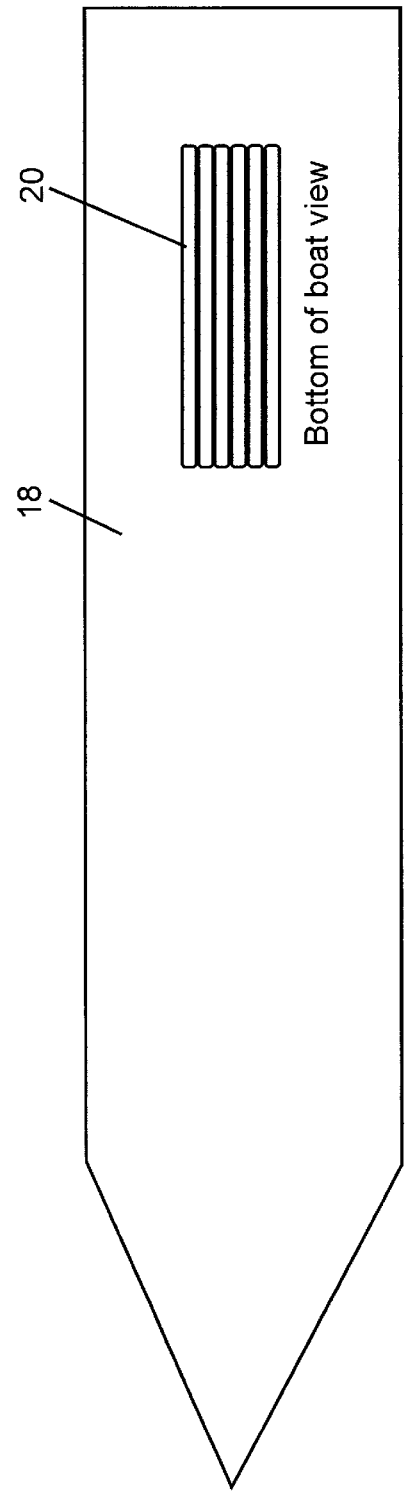

LIVE WELL AERATOR SYSTEM

BACKGROUND OF THE INVENTION

1. Field of the Invention

The present invention is directed to a live well aeration system, and more particularly, to a system in which a pump is used to pump water from a sea chest to a bait well containing live bait.

2. Description of the Related Art

When fishing from a boat, particularly a large or commercial fishing boat, it is a common practice to bring along bait fish in tanks known as live wells. In order to keep the bait fish alive for many hours, it is conventional to employ a pump for continuously pumping oxygenated water from outside the boat to the bait well containing live bait to replace water as the oxygen is being depleted by the bait fish. The live well typically has an overflow which allows displaced water to flow out of the live well and be discharged back to the ambient water.

Typically, the thru-hull aerator includes a pumping means which includes a through-transom fitting mounted in the boat transom below the normal water line and a pump mounted inside the boat on a fitting with a hose leading from the pump to the live well. Generally, the fitting is mounted below the planing surface so that the thru-hull fitting draws fresh water from outside the hull.

When the pump is associated with some means for introducing additional air into the water, the pump is referred to as an aerator. Several distinct types of aerators have been developed.

For example, U.S. Pat. No. 3,822,498 teaches an aerator for a live well wherein water is sucked through a pump and sprayed out a distributor manifold in the form of small jets above the surface of the water. As the jets pass through the air and then strike the surface of the water, the water picks up oxygen.

Many aerators and aerator systems utilize centrifugal rotary bilge pumps, which are well known in the art. In aerators and aerator systems which employ centrifugal bilge pumps as pumps (which are not self-priming), airlock in the pump can be a frequent problem. Airlock can be a particularly significant problem in thru-hull aerator installations. If the supply of water through the thru-hull fitting is not adequate (i.e., when the water intake fitting rises above the water level or when rough water causes the water intake to be exposed to the air), a pocket of air develops in the pump impeller, the pump loses it's prime and becomes airlocked. The back air pressure in the impeller pump output lines in combination with the pressure of the outside water at the intake scoop causes an air bubble to be held at the impeller, causing continuous airlock. Once an airlock develops, the pump ceases to pump water, and this condition jeopardizes the bait fish in the live well.

In most instances, airlock is cleared from the pump by turning the centrifugal pump off thus releasing the back pressure of air and allowing the water in the pump outlet hose to descend back through the centrifugal pump, thereby forcing any trapped air out of the impeller chamber. The pump is then restarted, and in theory, but not always in practice, the pump resumes the normal pumping of water. An alternative means to "jump start" an airlocked impeller, especially when the aerator is mounted in the boat transom, is to rapidly drive the boat in reverse thereby forcing water into the uptake fitting and pump chamber to clear the airlock. However, both of these methods are impractical in that they presuppose that the boat operator is aware that the pump has become airlocked. Often, especially with a live well full of bait fish, the time lapse between the pump becoming airlocked and its detection can mean the death of many bait fish.

In order to avoid drag associated with thru-hull fittings, and in order to avoid problems of plugging of the small thru-hull opening when driving through sea weed or sea grass, there has been a trend to using sea chests to communicate between the pump inlet and the ambient water. The sea chest can be considered a downward opening concavity which is intended to remain below the waterline at whatever speed the boat travels, and is generally provided with a grate or sea grass exclusion mechanism. As such, the sea chest is not intended to communicate with the air, and is intended to provide a continuous source of water to the pump. However, in practice, it has been found that a boat traveling at rapid speed will cause significant amounts of air to pass under the hull in the form of bubbles. These bubbles tend to collect in the sea chest and can be sucked into the aerator pump, resulting in airlock.

Numerous attempts have been made over the years to invent an aerator which prevents or relieves airlock. One is an "anti-airlock" pump manufactured by Rule. This pump incorporates a device which is designed to periodically detect whether there is air present at the pump impeller. If air is detected at the pump impeller, the device shuts the pump off, allowing air to leave through the impeller output line. However, this device does not proactively clear the airlock, and the impeller pump may remain airlocked during the interval between testing for airlock.

U.S. Pat. No. 5,632,220 teaches an aerator wherein an air relief outlet is in communication with the impeller housing and upstream of the impeller. When a build up of air causes airlock, the pump loses suction, which causes a valve associated with the air relief outlet to open enabling air to vent and thereby clearing the airlock. However, there is a need for a more simple and direct means for preventing airlock in an aerator which draws water through a sea chest.

In view of the foregoing, it is an object of the present invention to provide an aerator in communication with a sea-chest which eliminates or minimizes the above-mentioned and other problems, limitations and disadvantages.

SUMMARY OF THE INVENTION

The present inventor has investigated and experimented with various aerator and pump arrangements, and first attempted to simply connect a "breather" tube connected at one end to the top of the sea chest and at the other end to the atmosphere. However, the present inventor found that as the boat increases in speed, pressure builds up in the sea chest, and as a result water is forced up and out through the breather tube. This could lead to flooding of the boat, a problem that could be corrected by venting over the side. However, it was also found that such venting would prevent a buildup of pressure in the sea chest. Pressure is desirable in that pressure in the sea chest increases pressure at the input side pressure to the aerator pump, thereby increasing aerator pump efficiency. A loss of sea chest pressure reduces aerator pump efficiency.

Further, it was found that grounding, which frequently occurred in boats designed for fishing in shallow water, or "flats boats", caused the sea chest inlet opening to be temporarily sealed. Sealing of the sea chest while the bait pump or aerator was running caused a vacuum in the sea chest. Once a vacuum was established in the sea chest, air was sucked in through the breather tube, into the sea chest, and into the bait pump or aerator, causing airlock.

The present inventor discovered that the above problems could be solved by providing a sea-chest with an air relief line including at least a one-way valve.

In a first embodiment of the invention, the valve is designed to close in response to an increase in pressure or rising water levels at the valve which occur when pressure in the sea chest increases, thus maintaining pressure in the sea chest, thereby increasing bait pump or aerator efficiency.

In a second embodiment of the invention, the valve permitted venting of air from the sea chest yet closed in response to lowering of pressure or water level at the valve, thus preventing air from being sucked into the sea chest in the event of grounding. Once the boat is no longer grounded, the sea-chest loses vacuum, and several things happen: (1) the sea-chest is open to the ambient water and the aerator pump can draw in water, (2) there is no longer vacuum in the sea chest, and thus the valve is no longer held closed, and (3) any air which may have been trapped in the sea-chest is free to rise and is vented out through the air relief line.

The present inventor was thus able to determine that a conventional sea-chest and centrifugal pump arrangement could be modified so as to prevent or clear airlocks by providing (1) a sea-chest, (2) a bait well, (3) a bait pump or aerator for pumping water from said sea-chest to said bait well, and (4) a vent line connected to the sea-chest, through which air from the sea chest can rise, the vent line being provided with a valve which closes in response to a change in pressure or water level. The valve may close in response to an increase in pressure or water level, or may close in response to a decrease in pressure or water level. Preferably, the valve closes in response to both increases and decreases in water pressure or water level.

In a preferred embodiment the valve is made of a lightweight material such as a hollow plastic ball and seal rings made of flexible elastomer such as elastomeric plastic, silicon, or rubber. This valve is provided above the water level and near the outlet of the vent line, preferably at or near an elbow in the vent line. This permits the valve to function to permit air to escape upwardly, yet close when water pressure causes an upward flow of water. Further, by being situated at or near the top of the vent line, it is impossible for a column of water to build up over the vent, causing downward pressure on the vent and preventing escape of air from the sea chest to the atmosphere.

It is also preferred that the vent line is in communication with the uppermost area of the sea chest, and in order to further facilitate collection and venting of air it is preferred that the sea chest be designed with an apex or dome or upside-down conical roof to facilitate collection of air.

The present invention thus provides a live well aeration system in which airlock of the aerator pump is prevented, which system and device is not mechanically complex and does not require constant monitoring by the operator of the boat.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the concept and the specific embodiments disclosed may be readily utilized as a basis for modifying or designing other aerators for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in with the accompanying drawings in which:

FIG. 1 is a side elevational view of a cross-section of a boat hull with the aeration system of the present invention in an operable orientation;

FIG. 2 is a bottom view of the hull of the boat showing the sea chest intake strainer;

DETAILED DESCRIPTION OF THE INVENTION

Figure 6:
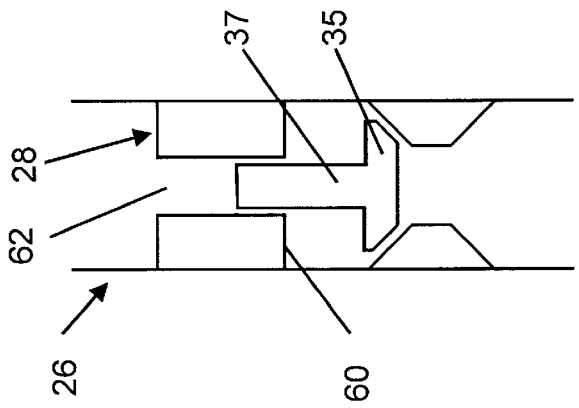
FIG. 6 is a cross-sectional view of the air relief line showing a fourth embodiment of the check valve.

The present invention is directed to a live well aeration system in which a pump is used to pump water from a sea chest to a bait well containing live bait. Air or oxygen for increasing the oxygen content of the water being supplied to the bait well may be introduced at some point between the sea chest and the live well.

As used herein, the term pump or bait well pump is intended include a bait well pump which simply pumps ambient water to the live well, an aerator which pumps an air and water mixture to the live well, and an oxygenator which pumps water into which pure oxygen has been introduced. The present invention is based on the discovery that airlock of the aerator pump can be prevented by providing the sea-chest with an air relief line such that air accumulating in the sea-chest is released to the atmosphere before it can be suctioned into the impeller.

The term "centrifugal pump" as used herein is intended to mean a pump, which utilizes the throwing force of a rapidly moving impeller. The liquid is pulled in at the center or eye of the impeller and is discharged at the outer rim of this impeller. By the time the liquid reaches the outer rim of the impeller, it has acquired considerable velocity. The liquid is then slowed down by being led through either a volute or a conical housing. The simplest method for converting dynamic pressure to static pressure is to slowly increase the volute delivery channel area (e.g., a taper of no greater than 8°). This is known as a diffuser and is often used on small pumps. As the velocity of the liquid decreases, its pressure increases. The shape of the outlet has the effect of changing the low-pressure, high velocity fluid to high pressure, low velocity fluid. That is, some of the mechanical kinetic energy is transformed into mechanical potential energy, or in other words, the velocity head is partially turned into a pressure head. Obviously, the pump steps up the pressure between the pump inlet and pump outlet. As the pressure at the pump inlet side is increased, the pressure at the pump outlet side is increased. Any increase in pump outlet pressure can be considered an increase in pump efficiency. Conversely, if pressure is allowed to bleed off the sea chest through a breather tube, this drop in pressure will be translated into a measurable decrease in pump efficiency, which is to be avoided.

The aerator employed in the present invention may also be of the type having an air supply line in communication with the impeller inlet for feeding a small, continuous flow of a gas containing oxygen (either atmospheric or oxygen under pressure) to the impeller. The rapidly rotating impeller of the pump minces this air and thoroughly mixes it with water being pumped. The precise manner in which the impeller minces the air and water and creates air bubbles is not understood, but it is logical to assume that the rapid changes of direction from (1) axial at the eye to (2) radial in the impeller to (3) axial between the impeller tip and the outlet to (4) radial at the water outlet, and also the changes in speeds, pressures, shear forces, and other forces acting within the impeller have an effect on the formation of ultra-fine bubbles.

An impeller may be of either the centrifugal pump type or the compressor type, with centrifugal pump type impellers being greatly preferred. Pump impellers are generally cast in one piece with a hub; compressor impellers are generally fabricated.

The device according to the present invention will now be discussed in greater detail by reference to the drawings.

FIG. 1 illustrates a side cross-sectional view of a boat including boat hull 18 and a sea-chest 10 which is in communication with the pump 12 which pumps water from the sea-chest to the live bait well 14. The sea-chest has a longitudinally extending intake strainer 20 that is positioned along the boat hull. The sea-chest inlet is obviously positioned below the water line 1, the water line being the ambient water level determined when the boat is at rest. The upper water level of the bait well is preferably provided above the water line 1, such that as water is pumped into the live bait well, displaced water can flow out and over the side by gravity.

The sea-chest, preferably at an uppermost point, is in communication with an air conduit 22. The air conduit forms part of the air relief system 24. The air relief system 24 has an upper outlet 27 situated above the water line. The diameter of the air relief line may vary depending upon the size of the fishing boat and sea chest, and may be as little as approximately 0.2 cm internal diameter or as large as 4 cm internal diameter, and may be formed of a rigid or flexible metal, plastic or rubber tubing. Positioned within the air relief line is a check valve 26. The check valve may be at approximately the ambient water level 1 as shown, or is more preferably provide at the uppermost region of the air relief line.

Figure 3:
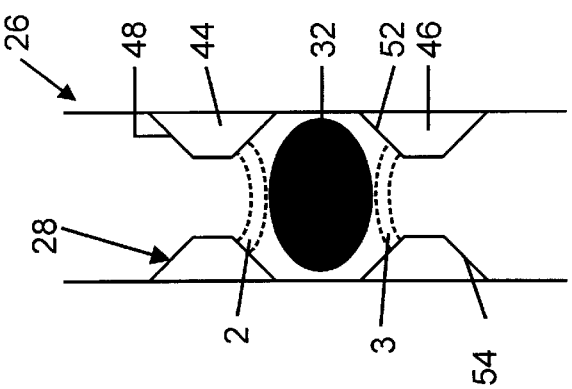
FIG. 3 is a cross-sectional view of the air relief line showing a first embodiment of a check valve.

The check valve may be either a single acting (one way) check valve, or may be a double acting (two way) check valve. As illustrated in FIGS. 3–6, the two way check valve may have any of a variety of designs, each illustrated embodiment characterized by a unique valve seat 28 within the air relief line. The valve of the first embodiment, as shown in FIG. 3, includes a ball member 32. The ball may be positively buoyant, negatively buoyant, or neutrally buoyant, but is preferably neutral or slightly positively buoyant so as to be lifted as water flows upwardly, and lowered as the water level drops. In any case, the ball should not be so heavy that air accumulating under the ball is not capable of lifting the ball and thereby escaping past said ball.

The valve may be a single acting valve wherein the ball seats as the water level drops, but which is prevented by optional bridge element 2 from seating as the water level rises or pressure increases. Similarly, the valve may be a single acting valve wherein the ball seats as the water level rises, but which is prevented by optional bridge element 3 from seating as the water level drops or pressure decreases.

The sensitivity of the valve depends upon the amount of travel permitted for ball 32. As shown, the distance of travel before seating is small, and thus the sensitivity is great. The distance through which the ball travels prior to seating may be from five to ten centimeters to as much as thirty centimeters, depending upon the size of the boat, the changes in draft upon loading of the boat, and the anticipated amount of pitch, yawl and roll in rough seas. However, in most cases a small amount of travel will be sufficient. FIG. 3 shows a version of the valve with little travel for ball 32, but it should be understood that greater travel distances between upper and lower seat positions are within the contemplation of the inventors.

Figure 4:
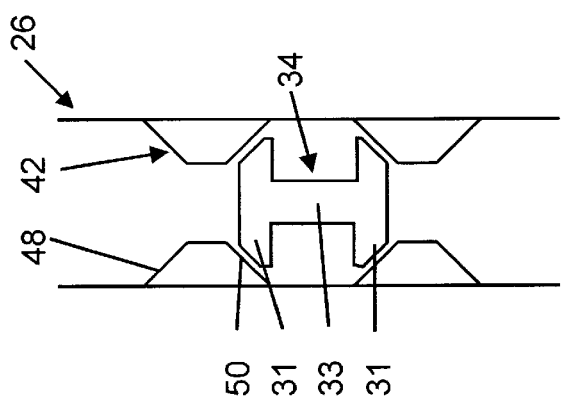
FIG. 4 is a cross-sectional view of the air relief line showing a second embodiment of the check valve.

FIG. 4 shows a second embodiment of the check valve wherein ball 32 is replaced by a two headed plug member 34. The two headed plug member comprises upper and lower piston disks 31 connected via shaft 33. The advantage of such a plug over a ball is the lower cost in material and the greater surface area exposed to the flow of water, and thus the greater responsiveness to changes in flow of water.

Figure 5:
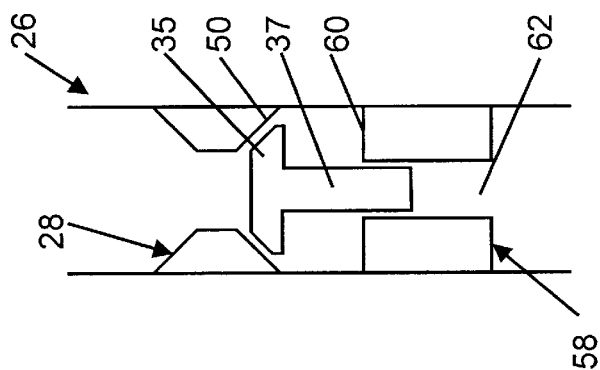
FIG. 5 is a cross-sectional view of the air relief line showing a third embodiment of the check valve.

A third embodiment, depicted in FIG. 5, includes a "T" plug member with an upper piston disk 35 and a lower shaft 37. The fourth embodiment as shown in FIG. 6 employs an inverted single head "T" plug member with a lower disk 35 and an upper shaft 37.

The same valve seat design may be used within the air relief line for both the ball member 32 and the two headed plug member 34. For the double acting valve, the valve seat 42 has an upper seat 44 and a lower seat 46, which may be any constriction into which the float can sealingly fit. The upper ring may have sloping upper 48 and lower 50 walls. The lower seat 46 may have sloping upper 52 and lower 54 walls. In operation, the seat walls 50, 52 of the upper seat ring and the lower seat ring are engaged with the ball member 32 or the two headed plug member 34, depending upon the direction of flow of the water, the level of the water, or the pressure.

The valve seat shown in FIG. 5 has an upper seat ring seat wall 50 which is preferably beveled or tapered for ease of receiving piston disk 35, and a lower seat ring seat ring wall 60. The lower valve seat ring 58 includes a cylindrical passage adapted for receiving shaft 37, which passage and shaft cooperate to allow the piston disk 35 of the upright plug to slide up and down responsive to flow of water or water level, and to precisely engage supper seat ring 28 when in the upper position, closing the valve when water is pushing up from the sea-chest. The piston disk 35 is light weight and does not impede the escape of air pushing upwardly, bubbling by the valve.

The valve shown in FIG. 6 is identical to the valve of FIG. 5, but is upside down and thus performs a different function. That is, in the case that the boat runs aground or otherwise obstructs sea chest opening, vacuum in the sea chest draws water and/or air down vent line 26, which causes piston disk 35 to seat against seat ring 50.

The operation of the valve will now be described. Where the valve is at or near the top of the vent line, it is preferred that the ball or valve is made of a light-weight material and that the seal ring is made of an elastic, easily deformable material such that, on the one hand, small amounts of upward pressure can lift the ball and allow air to vent, and on the other hand, a good seal is easily formed, such that any vacuum in the sea chest (as when the boat grounds and the sea chest is sealed while the bait well pump remains running) would cause the valve to close. Once vacuum is released, the ball rests on the lower ring seat, with only slight pressure, such that any air traveling up relief line can lift and pass by the ball. As the boat picks up speed and pressure increases in the sea-chest, pressure is hydraulically transmitted up the vent line and the pressure and/or the rising water level causes the positively buoyant ball to be lifted to the upper seat ring, sealing the valve causing pressure to be maintained in the sea chest. The pressure in the sea-chest keeps the live well pump operating at peak efficiency.

In preferred embodiments of the invention, the live well pump is an aerator as disclosed in U.S. Pat. No. 5,632,220 (Vento) and U.S. Pat. No. 5,582,777 (Vento et al).

Although this invention has been described in its preferred form with a certain degree of particularity with respect to a vented sea-chest, it is understood that the present disclosure of the preferred form has been made only by way of example and that numerous changes in the details of structures and the composition of the combination may be resorted to without departing from the spirit and scope of the invention.

Now that the invention has been described,

What is claimed is:

1. A boat live well aeration system comprising:

a boat hull including a sea-chest having an inlet and an outlet;

a bait well;

a pump for pumping water from said sea-chest to said bait well; and a vent line connected to said sea-chest for venting air from said sea chest, said vent line being provided with a valve which closes in response to a change in pressure and/or water level.

2. A boat live well aeration system as in claim 1, wherein said valve closes in response to an increase in pressure.

3. A boat live well aeration system as in claim 1, wherein said valve closes in response to a rise in water level.

4. A boat live well aeration system as in claim 1, wherein said valve closes in response to a decrease in pressure.

5. A boat live well aeration system as in claim 1, wherein said valve closes in response to a lowering in water level.

6. A boat live well aeration system as in claim 1, wherein said valve is closed at rest in a first position, wherein air traveling up said vent line causes said valve to open, and wherein water traveling up said vent line causes said valve to close in a second position.

7. A boat live well aeration system as in claim 1, wherein said valve is provided above the water level at or near the uppermost area of the vent line.

8. A boat live well aeration system as in claim 1, wherein said valve is provided at approximately the water line of the boat.

9. A boat live well aeration system as in claim 1, wherein said valve is selected from the group consisting of a ball valve, a membrane valve, and a piston valve.

10. A boat live well aeration system as in claim 9, wherein said piston value includes a piston part for sealing engagement with a ring seal, and a piston rod part for sliding engagement in a cylindrical bore coaxial with and inside said vent line.

11. A boat live well aeration system as in claim 1, wherein said sea chest is provided with an uppermost region which is tapered for collection of air.

12. A boat live well aeration system as in claim 11, wherein said tapered region is semi-elliptical, hemispherical, or upwardly-tapered cone shaped.

* * * * *